(12) United States Patent
Wilkening et al.

(10) Patent No.: US 9,706,697 B2
(45) Date of Patent: Jul. 18, 2017

(54) AGRICULTURAL SYSTEM WITH A BALER AND TOW TRACTOR AND A STEERING ARRANGEMENT BY WHICH THE BALER IS STEERED AUTONOMOUSLY

(71) Applicant: CLAAS OMAHA INC., Omaha, NE (US)

(72) Inventors: Kevin Wilkening, La Vista, NE (US); Seth Zentner, Omaha, NE (US)

(73) Assignee: CLAAS OMAHA, INC., Omaha, NE (US)

( * ) Notice: Subject to any disclaimer, the term of this patent is extended or adjusted under 35 U.S.C. 154(b) by 85 days.

(21) Appl. No.: 14/812,156

(22) Filed: Jul. 29, 2015

(65) Prior Publication Data

US 2017/0027101 A1  Feb. 2, 2017

(51) Int. Cl.
| | |
|---|---|
| *G01C 22/00* | (2006.01) |
| *G05D 1/00* | (2006.01) |
| *A01B 69/00* | (2006.01) |
| *A01D 87/00* | (2006.01) |
| *A01F 15/00* | (2006.01) |
| *A01D 89/00* | (2006.01) |
| *A01F 15/08* | (2006.01) |

(52) U.S. Cl.
CPC ........ *A01B 69/004* (2013.01); *A01D 87/0023* (2013.01); *A01D 89/00* (2013.01); *A01F 15/00* (2013.01); *A01F 15/08* (2013.01); *A01F 15/0825* (2013.01); *A01F 15/0833* (2013.01)

(58) Field of Classification Search
CPC .......... G05D 2201/0201; A01B 69/008; A01B 69/004; A01B 69/001; A01B 69/003; A01F 15/0833; A01D 41/1278

USPC .......................................................... 701/23
See application file for complete search history.

(56) References Cited

U.S. PATENT DOCUMENTS

| | | | | |
|---|---|---|---|---|
| 3,952,828 A | * | 4/1976 | Stampfer ............. | A01B 69/008 180/401 |
| 4,065,914 A | * | 1/1978 | Phillips ............... | A01F 15/0833 56/15.4 |
| 4,224,867 A | * | 9/1980 | Gaeddert ............. | A01F 15/0833 100/88 |
| 4,295,323 A | * | 10/1981 | Maier ................ | A01D 41/1278 56/10.2 R |
| 4,433,533 A | * | 2/1984 | Giani ................. | A01F 15/0833 100/99 |
| 4,517,795 A | * | 5/1985 | Meiers ............... | A01F 15/0833 100/88 |

(Continued)

FOREIGN PATENT DOCUMENTS

EP     1 813 146     8/2007

*Primary Examiner* — Árpád Fábián-Kovács
(74) *Attorney, Agent, or Firm* — Michael J. Striker

(57) ABSTRACT

An agricultural system includes a baler for picking up and compressing crop from a crop swath in a field and a tow tractor. The baler is towed by the tow tractor via a draft hitch arrangement, which draft hitch arrangement allows a baler pickup track to be laterally offset from the tractor driving track with respect to the tractor driving direction. During baling, the baler pickup track is aligned to the crop swath for picking up crop and the tractor driving track is laterally spaced from the crop swath with respect to the tractor driving direction. A steering system autonomously aligns the baler pickup track onto the crop swath.

14 Claims, 3 Drawing Sheets

(56) References Cited

U.S. PATENT DOCUMENTS

| | | | | |
|---|---|---|---|---|
| 4,702,066 A | * | 10/1987 | Newendorp | A01F 15/0833 100/88 |
| 4,748,802 A | * | 6/1988 | Strosser | A01F 15/0833 100/88 |
| 4,850,271 A | * | 7/1989 | White | A01F 15/0833 100/88 |
| 5,165,332 A | * | 11/1992 | Lee | A01F 15/0833 100/40 |
| 5,408,817 A | * | 4/1995 | Wagstaff | A01F 15/0833 56/10.2 R |
| 5,444,969 A | * | 8/1995 | Wagstaff | A01F 15/0833 100/88 |
| 5,615,544 A | * | 4/1997 | Berger | A01F 15/0833 100/88 |
| 5,715,665 A | * | 2/1998 | Diekhans | A01D 41/1278 172/4.5 |
| 5,715,666 A | * | 2/1998 | Huster | A01D 41/1278 56/10.2 F |
| 6,000,206 A | * | 12/1999 | Case | A01F 15/08 100/88 |
| 6,101,795 A | * | 8/2000 | Diekhans | A01D 41/1278 180/401 |
| 6,199,355 B1 | * | 3/2001 | Stiefvater | A01D 67/005 56/14.9 |
| 7,155,888 B2 | * | 1/2007 | Diekhans | A01D 41/1278 56/10.2 R |
| 7,404,355 B2 | | 7/2008 | Viaud et al. | |
| 8,200,399 B2 | | 6/2012 | Madsen | |
| 8,234,033 B2 | * | 7/2012 | Brubaker | A01B 69/008 100/4 |
| 2010/0122632 A1 | | 5/2010 | Biziorek et al. | |
| 2012/0240546 A1 | * | 9/2012 | Kormann | A01B 69/006 56/344 |
| 2013/0186657 A1 | * | 7/2013 | Kormann | A01B 69/005 172/1 |
| 2015/0134175 A1 | * | 5/2015 | Derscheid | A01F 15/0825 701/23 |
| 2015/0305241 A1 | * | 10/2015 | Waechter | A01F 15/08 56/10.2 R |

* cited by examiner

AGRICULTURAL SYSTEM WITH A BALER AND TOW TRACTOR AND A STEERING ARRANGEMENT BY WHICH THE BALER IS STEERED AUTONOMOUSLY

BACKGROUND OF THE INVENTION

The invention is directed to a baler for picking up and compressing crop (4) from a crop swath and to an agricultural system including such a baler.

The agricultural system in question has the purpose of baling crop from a longitudinally extending crop swath in a field. The baler is being towed by a tow tractor via a draft hitch arrangement. Such an agricultural system is known for example from U.S. Pat. No. 8,200,399 B2.

In the above noted known agricultural system the draft hitch arrangement allows the baler pickup track to be slightly adjusted in lateral direction with respect to the tractor driving track in order to ensure that the baler is positioned optimally for picking up the crop from the crop swath in the field. For this the tractor comprises a sensor arrangement that detects geometrical information about the crop swath, such that the baler pickup track may be adjusted based on this information.

SUMMARY OF THE INVENTION

One disadvantage of the known agricultural system is the fact that not only the baler, but also the tractor is driving directly over the crop swath. This means that in the case of any misalignment of the tractor, at least part of the crop swath may be undesirably compressed. It may also occur that the tractor pushes part of the crop swath ahead of itself leading to a build-up of crop in front of the tractor which in the end has to be removed manually by the operator.

Both above noted disadvantages of the known agricultural system lead to a decrease of efficiency in the baling process.

It is therefore an object of the invention to improve the known agricultural system such that the efficiency of the baling process is increased with low constructional effort.

The proposed solution is generally based on the baler pickup track and the tractor driving track being laterally offset from each other with respect to the tractor driving direction. The expression "baler pickup track" describes the area on the field being swept over by the pickup device of the baler during the baling process. The expression "tractor driving track" describes the track on the field defined by the outermost wheels or, if so, crawler tracks of the tractor during the baling process. The expression "tow tractor" is to be understood in a broad sense and includes all kind of vehicles suitable to tow a baler, including wheeled vehicles and crawler type vehicles.

The solution according to the invention is based on the general idea that providing the tractor driving track laterally spaced from the crop swath allows the baler to autonomously align its baler pickup track onto a crop swath with low constructional effort. The reason for this is that due to the resulting lateral offset between the tractor and the baler the area in front of the baler is free of the tractor. With this it is possible to provide the baler with a sensor arrangement which detection range is located in front of the baler. Based on the detection of the sensor arrangement the baler may align itself to the crop swath autonomously, which means that such alignment may be performed without any additional external sensor information, for example sensor information coming from the tow tractor.

In detail it is proposed that the baler is being towed by the tow tractor via a draft hitch arrangement, which draft hitch arrangement allows the baler pickup track to be laterally offset from the tractor driving track. During baling, the baler pickup track is aligned onto the crop swath for picking up crop and the tractor driving track is laterally spaced from the crop swath, such that the baling process is optimized and particularly, such that the baling process is not impaired by the tractor running over the crop swath.

For autonomously aligning the baler pickup track onto the crop swath, the baler comprises a steering system. This steering system comprises a sensor arrangement for detecting the cross profile of the crop swath at a location in front of the baler. The steering system further comprises a steering control and a steering drive, which steering control continuously aligns the baler pickup track onto the crop swath via the steering drive based on a predefined steering strategy and based on the detected profile.

For realizing the sensor arrangement a number of advantages solutions are possible. Preferably the sensor arrangement is an optical sensor arrangement, in particular a camera sensor arrangement.

According to the invention, there are a number of steering strategies possible. A simple and at the same time effective steering strategy is to center the baler pickup track to the crop swath. This is particularly advantageous since for most balers it is important that the crop is being picked up from the crop swath evenly across the width of the pickup device of the baler such that the compression of the crop inside the baler is evenly performed accordingly. This ensures that the resulting bales are of on and the same, reproducible geometry.

According to an embodiment, the hitch of the bailer may be deflected into different hitch positions in order to align the baler pickup track to the crop swath as proposed. For this the steering drive preferably comprises a hydraulic adjust cylinder which is in driving engagement with the hitch.

As an alternative it is possible that the baler comprises a chassis with at least two steerable wheels. Here the wheels are steerable by the steering drive. While the deflection of the draft hitch arrangement by the steering drive is easy to realize in constructional view, steering the wheels of the baler by the steering drive leads to a particularly quick reaction on any drive movement of the steering drive.

In an embodiment, the steering system of the baler comprises a communication module to communicate with a drive control of the tow tractor. This allows, for example, that the baler controls the steering of the tow tractor, in particular if a steering adjustment of the tow tractor is required for the baler to autonomously align its baler pickup track to the crop swath. This prevents the agricultural system to have to stop if the baler cannot perform the alignment due to the tractor driving track drifting too far away from the crop swath.

In another embodiment, the invention provides a baler for picking up and compressing crop from a crop swath in a field, wherein during baling the baler is being towed by a tow tractor via a draft hitch arrangement, which draft hitch arrangement allows the baler pickup track to be laterally offset from the tractor driving track with respect to the tractor driving direction, wherein during baling the baler pickup track is aligned to the crop swath for picking up crop and the tractor driving track is laterally spaced from the crop swath with respect to the tractor driving direction, wherein the baler comprises a steering system for autonomously aligning the baler pickup track onto the crop swath, wherein the steering system comprises a sensor arrangement for detecting the geometrical profile of the crop swath at a location in front of the baler, wherein the steering system comprises a steering control and a steering drive, which steering control continuously aligns the baler pickup track onto the crop swath via the steering drive based on a pre-defined steering strategy and based on the detective profile. All advantages, variance and alternatives given for the first teaching are fully applicable to the second teaching.

BRIEF DESCRIPTION OF THE DRAWINGS

In the following the invention will be described based on examples with reference to the drawings. In the drawings show FIG. 1a present a side view of an agricultural system according to the invention.

DETAILED DESCRIPTION OF THE PREFERRED EMBODIMENTS

Figure 2:
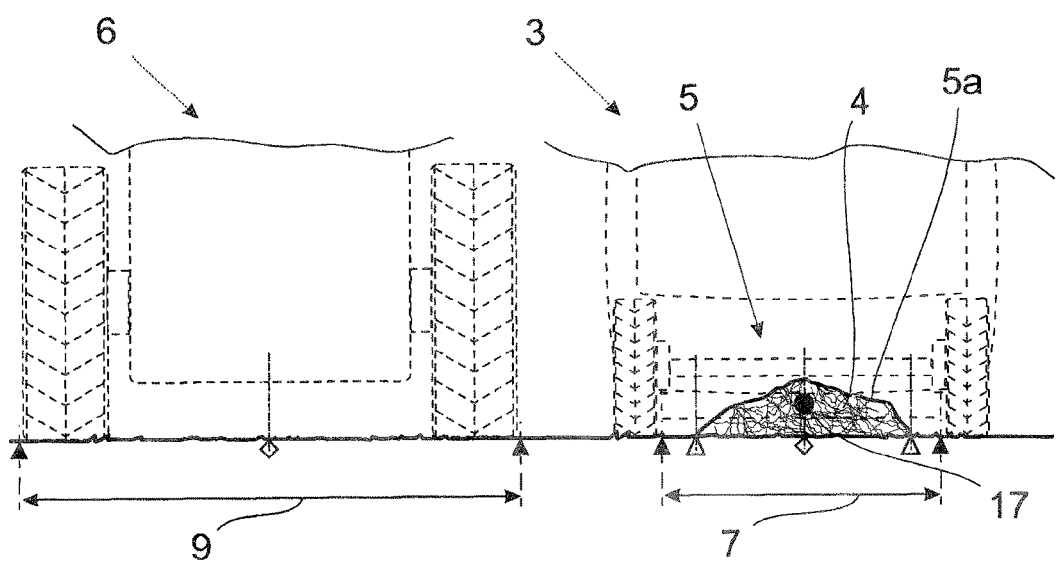
Figure 3:
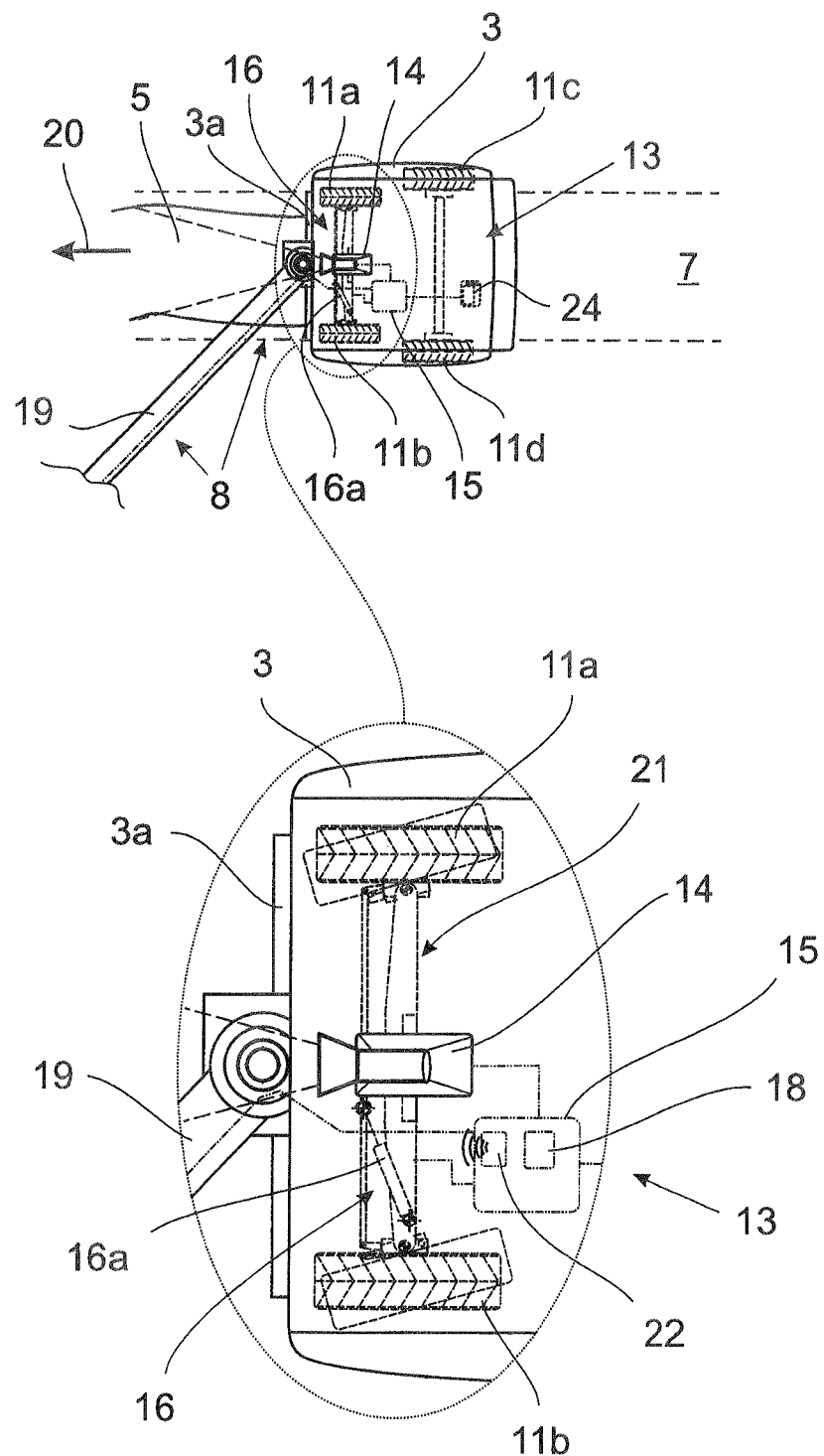
FIG. 3 presents the baler of the agricultural system of FIG. 1 with an alternative steering system.

The purpose of the proposed agricultural system 1 is to produce bales 2 using a baler 3 by picking up and compressing crop 4 from a crop swath 5 in a field. Such a crop swath 5 is being produced in a mowing process which precedes the baling process. The crop swath 5 normally extends along a line and comprises a certain cross profile. The cross profile goes back on the distribution of crop 4 across the crop swath 5. It is normally of overall convex shape as shown in FIG. 2.

The baler 3 comprises a pickup device 3a picking up crop 4 from the field along a baler pickup track 7. The picked up crop 4 is then processed into bales 2 as is generally known. The bales 2 may be of different design such as cylindrical, cubical or the like. It is mostly of particular importance that the baler 2 picks up the crop 4 as evenly as possible across the width of the pickup device 3a of the baler 3 in order to guarantee the production of bales 2 with one and the same geometry.

Figure 1:
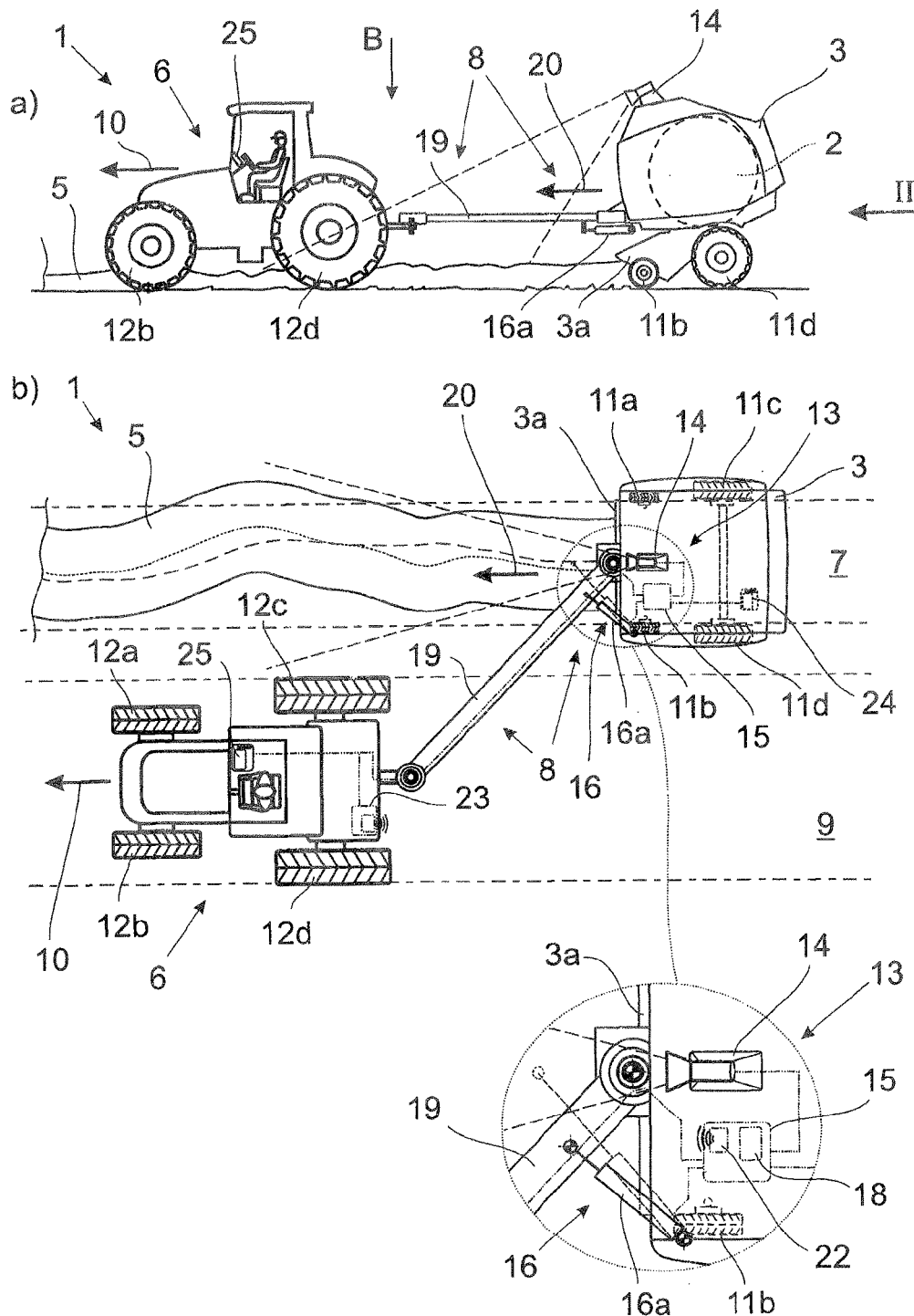
FIG. 1b presents a top view of the agricultural system, FIG. 2 present the agricultural system according to FIG. 1 in view II.

The proposed agricultural system 1 also comprises a tow tractor 6, which tows the baler 3 via a draft hitch arrangement 8 of the baler 3 (FIG. 1a).

One specialty about the proposed draft hitch arrangement 8 is its construction such that the baler pickup track 7 may be laterally offset from the tractor driving track 9 with respect to the tractor driving direction 10. With this it is first of all possible, as shown in FIG. 1b, that during baling the baler pickup track 7 is aligned to the crop swath 5 for picking up crop 4. With this alignment the above noted reproducibility regarding the generation of bales 2 can be guaranteed. At the same time the draft hitch arrangement 8 allows the tractor driving track 9 during baling to be laterally spaced from the crop swath 5 with respect to the tractor driving direction 10. FIG. 1b shows that with this laterally spacing of the tow tractor 6 the crop swath 5 is never being driven over by the tow tractor 6 which prevents an undesired compression of the crop swath 5.

It is to be understood that the baler 3 here and preferably comprises wheels 11a-d for moving along with the tow tractor 6. The tow tractor 6 normally comprises wheels 12a-d as well. However, the tow tractor 6 may just as well be of crawler type as noted above.

The baler 3 itself comprises a steering system 13 for autonomously aligning the baler pickup track 7 onto the crop swath 5. This means that the baler 3 aligns itself to the crop swath 5 solely by its own steering system 13. This autonomous approach to steering the baler 3 makes it possible to the baler 3 to be combined with any kind of tow tractor 6.

The steering system 13 comprises a sensor arrangement 14 for detecting geometrical information about the above noted cross profile 5a of the crop swath 5 at a location in front of the baler 3. This information is called "cross profile information" in the following. The expression "in front of" is to be understood with respect to the baler driving direction 20. The detection of cross profile information 5a may be performed in various levels of abstraction. In one embodiment, the sensor arrangement 14 for example detects the outer contour of the crop swath 5 as the cross profile information 5a. In another embodiment, the sensor arrangement 14 only detects the width of the crop swath 5 in a direction transverse to the longitudinal extension of the crop swath 5 as the cross profile information 5a.

The steering system 13 also comprises a steering control 15 and a steering drive 16, as shown in FIG. 1b as well. During baling, the steering control 15 continuously aligns the baler pickup track 7 onto the crop swath 5 via the steering drive 16 based on a predefined steering strategy and based on the detected cross profile information 5a. In other words, the alignment of the baler pickup track 7 to the crop swath 5 is being performed by a continuous adjustment of the steering of the baler 3 by the steering drive 16, while the baler 3 is being towed by the tow tractor 6.

It becomes apparent from FIGS. 1a, 1b that the location of the baler 3 and the tow tractor 6 laterally offset to each other leads to the area in front of the baler 3 to be completely free of the tow tractor 6, such that the sensor arrangement 14 of the baler 3 may detect the geometrical profile of the crop swath 5 without being impaired by the tow tractor 6.

Preferably, the sensor arrangement 14 of the baler 3 is an optical sensor arrangement, in particular a camera arrangement. It is further preferred that the camera arrangement is realized as a 3D camera arrangement. Other kinds of sensors may be applied for the sensor arrangement 14. Examples are laser scanners, ultrasonic sensors or the like. In the shown embodiments the sensor arrangement 14 comprises a camera. From the camera picture the outer contour of the crop swath 5 is being extracted as the cross profile information 5a, which the alignment of the baler pickup track 7 onto the crop swath 5 is based on.

Depending on the type of baler 3 and the type of crop swath 5 different steering strategies may be advantageous. Here and preferably the steering strategy is to center the baler pickup track 7 to the crop swath 5. Such centering is shown in FIG. 2 as an example. Here and preferably, first the center of area of the crop swath 5 is calculated, which is depicted with reference numeral 17. According to this steering strategy the baler pickup track 7 is then being aligned exactly to the calculated center of area 17.

As an alternative steering strategy, especially if the crop swath 5 is of uneven composition along its extension, it is proposed to optimize the alignment of the pickup track 7 onto the crop swath 5 such that during baling the pickup rate of crop 4 is evenly distributed across the pickup device 7. This may be achieved, for example, by cyclically switching between two baler pickup tracks, which two baler pickup tracks are located oppositely off-center in view of the cross profile of 5a of the crop swath 5. According to this steering strategy the baler 3 is being toggled between the two baler pickup tracks in order to achieve an even loading process of the baler 3.

Preferably, the steering system 13 of the baler 3 comprises a memory 18 in which a number of steering strategies are stored for selection by the user. Accordingly it is possible for the user to choose one steering strategy out of a group of steering strategies, which group may preferably be extended if necessary.

There are various possibilities to realize the steering of the baler 3 in constructional view.

In the preferred embodiment shown in FIG. 1*b* the draft hitch arrangement 8 of the baler 3 comprises a hitch 19 that may laterally be deflected with respect to the baler driving direction 20 by the steering drive 16 into different hitch positions. It becomes clear from FIG. 1*b* that such deflection causes the baler 3 to change its orientation with respect to the tow tractor 6, which in the end leads to changing the baler driving direction 20. This may easily be realized by providing the steering drive 16 with at least one hydraulic adjust cylinder 16*a* which is in driving engagement with the hitch 19 of the draft hitch arrangement 8.

As an alternative, in order to reduce the reaction time between a drive movement of the steering drive 16 and a change in baler driving direction 20, it may be advantageous to provide the baler 3 with a chassis 21 with at least two steerable wheels 11*a,b*, which wheels 11*a,b* are steerable by the steering drive 16.

Despite it being possible for the baler 3 to generally work as a stand-alone system in terms of control, in particular without the necessity to communicate with the tow tractor 6, it may be advantageous to establish a communication between the baler 3 and the tow tractor 6 as will be described. An example for this is to provide the possibility for the baler 3 to adapt the tractor driving direction 10 in order to ensure that the baler 3 can actually perform its alignment in accordance with the selected steering strategy. Therefore, preferably, the steering system 13 of the baler 3 comprises a communication module 22 to communicate with a drive control 23 of the tow tractor 6. This communication module 22 may establish a wire based communication with the drive control 23 of the tow tractor 6. However, here and preferably, the communication module 22 establishes a wireless communication with the drive control 23.

As noted above, it is especially preferred that the steering system 13 of the baler 3 controls the steering of the tow tractor 6 via the communication module 22. Further preferably, at least partly during baling, all steering actions of the tow tractor 6 are being remotely controlled by the steering system 13 of the baler 3 via the communication module 22.

However, in order to reduce the transmission of data it is preferred that an out of bounds condition is defined in which the steering strategy requires a steering adjustment of the tow tractor 6 and that the steering system 13 of the baler 3 controls the steering adjustment of the tow tractor 6 via the communication module 22. This means that the steering system 13 of the baler 3 only influences the steering of the tow tractor 6, if the above noted out of bounds condition is fulfilled.

The communication module 22 may be used in different ways during the baling process. For example, the communication module 22 is designed to transmit at least one of a hitch position, a request of steering adjustment of the tow tractor 6 and a user information. Other examples are possible.

The communication module 22 may also be designed to receive information from the tow tractor 6. Preferably, the communication module 22 is designed to receive at least one of a user input, a request to start autonomously aligning the baler pickup track 7, a request to stop autonomously aligning the baler pickup track 7, and a request to position the hitch 19 into a certain hitch position.

Preferably the baler 3 comprises an input/output module 24 to interact with the user. In particular it may be possible to select an above noted steering strategy via the input/output module 24. In addition or as an alternative the communication module 22 may allow to use an input/output module 25 of the tow tractor 6 in order to input or output baler relevant information, in particular to select an above noted steering strategy.

According to another teaching, the baler of the agricultural system 1 as such is claimed. All explanations given for the agricultural system 1 are fully applicable to the baler 3.

In particular the baler 3 picks up and compresses crop 4 from a crop swath 5 in a field, wherein the baler 3 comprises a pickup device 3*a* picking up crop 4 from the field along a baler pickup track 7, wherein during baling the baler 3 is being towed by a tow tractor 6 via a draft hitch arrangement 8, which draft hitch arrangement 8 allows the baler pickup track 7 to be laterally offset from the tractor driving track 9 with respect to the tractor driving direction 10, wherein during baling the baler pickup track 7 is aligned onto the crop swath 5 for picking up crop 4 and the tractor driving track 9 is laterally spaced from the crop swath 5 with respect to the tractor driving direction 10, wherein the baler 3 comprises a steering system 13 for autonomously aligning the baler pickup track 7 onto the crop swath 5, wherein the steering system 13 comprises a sensor arrangement 14 for detecting the cross profile information 5*a* of the crop swath 5 at a location in front of the baler 3, wherein the steering system 13 comprises a steering control 15 and a steering drive 16, which steering control 15 continuously aligns the baler pickup track 7 onto the crop swath 5 via the steering drive 16 based on a predefined steering strategy and based on the detected cross profile information 5*a*.

The above noted baler 3 is particularly advantageous as it is working autonomously. This makes it possible to combine the baler 3 with any kind of tow tractor 6, even with tow tractors 6 that are operating fully mechanically, i.e. without any electronic driver support system.

LIST OF REFERENCE NUMBERS 1 agricultural system
2 bales
3 baler
3*a* pickup device
4 crop
5 crop swath
5*a* cross profile of crop swath
6 tow tractor
7 baler pickup track
8 draft hitch arrangement
9 tractor driving track
10 tractor driving direction
11*a-d* wheel baler
12*a-d* wheel tractor
13 steering system
14 sensor arrangement
15 steering control
16 steering drive
16*a* cylinder of steering drive 17 center of area
18 memory
19 hitch of draft hitch arrangement
20 baler driving direction
21 chassis baler
22 communication module
23 drive control tractor
24 input/output-module baler
25 input/output-module tractor

What is claimed is:

1. Agricultural system, comprising
a baler for picking up and compressing crop from a crop swath in a field; and
a tow tractor;
wherein the baler comprises a pickup device for picking up crop from the field along a baler pickup track and a baler steering system for autonomously aligning the baler pickup track onto the crop swath;
wherein the baler is towed by the tow tractor via a draft hitch arrangement that is constructed such that the baler pickup track is laterally offset from the tractor driving track with respect to a tractor driving direction;
wherein during baling, the baler pickup track is aligned onto the crop swath for picking up crop and the tractor driving track is laterally spaced from the crop swath with respect to the tractor driving direction;
wherein the baler steering system comprises a sensor arrangement for detecting cross profile information of the crop swath with respect to a longitudinal extension of the crop swath at a location in front of the baler, a baler steering control and a baler steering drive; and
wherein the baler steering control, during baling, continuously aligns, autonomously from the tractor, the baler pickup track onto the crop swath via the baler steering drive based on a predefined steering strategy and based on the cross profile information detected by the sensor arrangement of the baler steering system.

2. The agricultural system according to claim 1, wherein one predefined steering strategy is to center the baler pickup track to the crop swath.

3. The agricultural system according to claim 1, wherein one predefined steering strategy is to optimize the alignment of the pickup track onto the crop swath such that during baling the pickup rate of crop is evenly distributed across the pickup device.

4. The agricultural system according to claim 1, wherein the baler steering system comprises a memory in which a number of steering strategies are stored for selection by the user.

5. The agricultural system according to claim 1, wherein the draft hitch arrangement comprises a hitch that may laterally be deflected with respect to the baler driving direction by the steering drive into different hitch positions.

6. The agricultural system according to claim 1, wherein the baler steering drive comprises at least one hydraulic adjust cylinder which is in driving engagement with the hitch.

7. The agricultural system according to claim 1, wherein the baler comprises a chassis with at least two steerable wheels that are steerable by the baler steering drive.

8. The agricultural system according to claim 1, wherein the steering system comprises a communication module to communicate with a drive control of the tow tractor.

9. The agricultural system according to claim 8, wherein the baler steering system controls the steering of the tow tractor via the communication module.

10. The agricultural system according to claim 8, wherein an out of bounds condition is defined in which the steering strategy requires a steering adjustment of the tow tractor and that the baler steering system controls the steering adjustment of the tow tractor via the communication module.

11. The agricultural system according to claim 10, wherein the communication module is designed to transmit at least one of hitch position, a request of steering adjustment of the tow tractor and a user information.

12. The agricultural system according to claim 8, wherein the communication module is designed to receive at least one of a user input, a request to start autonomously aligning the baler pickup track, a request to stop autonomously aligning the baler pickup track, and a request to position the hitch into a certain hitch position.

13. The agricultural system according to claim 1, wherein the baler comprises an input/output module to interact with the user.

14. A baler for picking up and compressing crop from a crop swath in a field, comprising:
a pickup device picking up crop from the field along a baler pickup track; and
a baler steering system for autonomously aligning the baler pickup track onto the crop swath;
wherein during baling, the baler is towed by a tow tractor via a draft hitch arrangement that allows the baler pickup track to be laterally offset from the tractor driving track with respect to a tractor driving direction;
wherein during baling, the baler pickup track is aligned onto the crop swath for picking up crop and the tractor driving track is laterally spaced from the crop swath with respect to the tractor driving direction;
wherein the baler steering system comprises a sensor arrangement for detecting cross profile information of the crop swath at a location in front of the baler; and
wherein the baler steering system comprises a baler steering control and a baler steering drive that during baling, continuously aligns, autonomously from the tractor, the baler pickup track onto the crop swath via the baler steering drive based on a predefined steering strategy and based on the cross profile information detected by the sensor arrangement of the baler steering system.

* * * * *